United States Patent Office 3,469,915
Patented Sept. 30, 1969

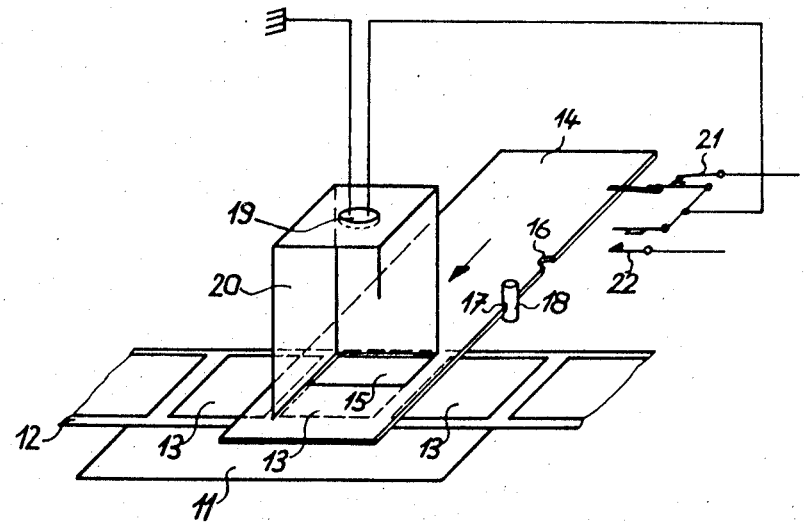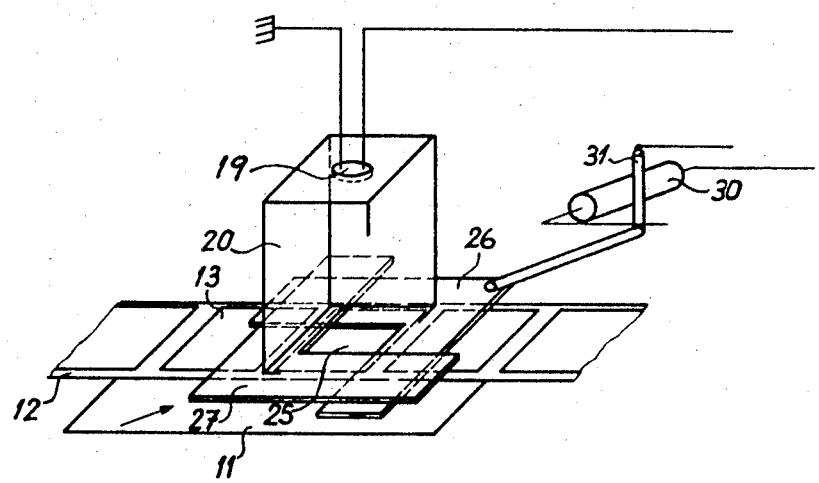

3,469,915
METHOD OF AND APPARATUS FOR AUTOMATICALLY CONTROLLING EXPOSURE TIMES IN A PHOTOGRAPHIC COPYING MACHINE
Kurt Thaddey, Buchs, Zurich, Switzerland, assignor to Ciba Limited, Basel, Switzerland, a corporation of Switzerland
Filed Aug. 31, 1967, Ser. No. 664,754
Claims priority, application Switzerland, Sept. 22, 1966, 13,685/66
Int. Cl. G03b 27/78
U.S. Cl. 355—38                                10 Claims

ABSTRACT OF THE DISCLOSURE

A method and apparatus for automatically controlling exposure times in a photographic copying machine.

Figure 3:
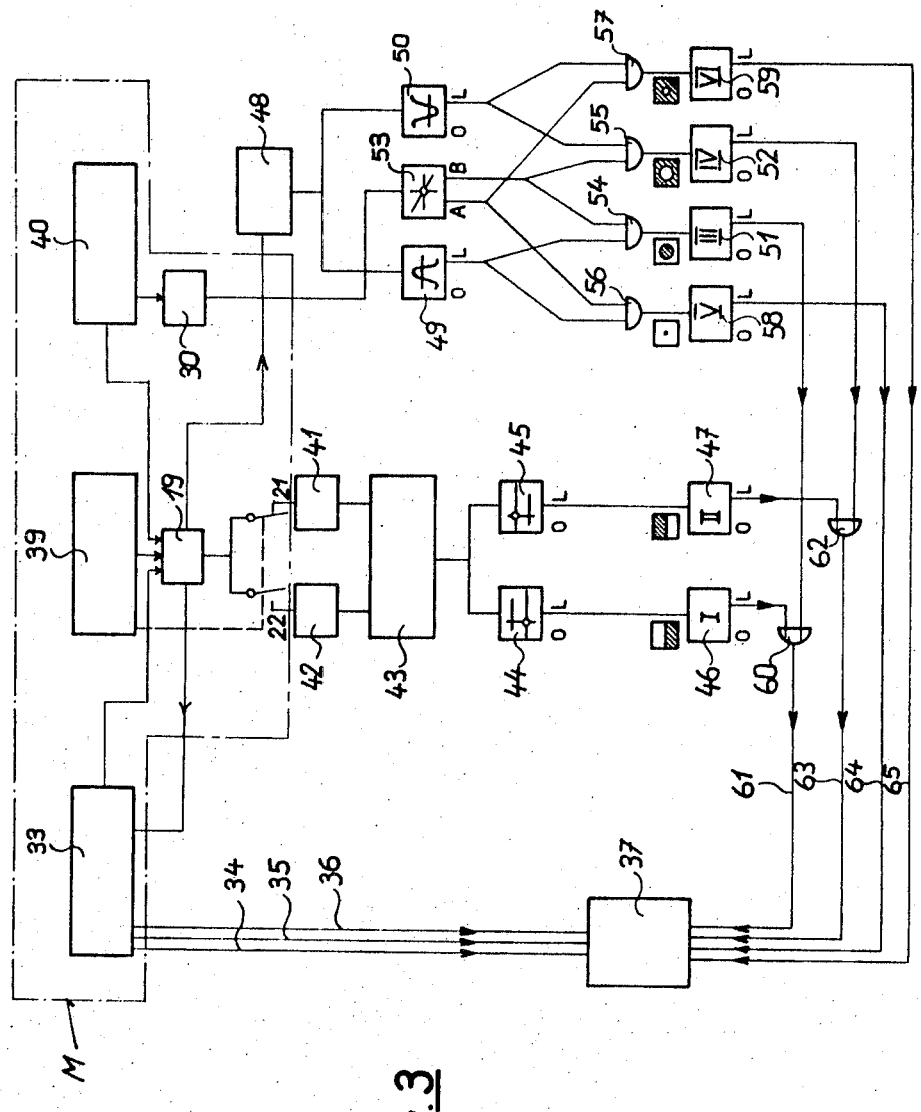

Colour exposure signals, generated by a measurement of the overall brightness, of a picture to be copied are corrected for excessive differences in brightness. The correction signals obtained are the result of a comparison between the upper and lower halves of the picture and a comparison in brightness between a centrally located small area in the picture and the remainder of the picture. This is detected by scanning the picture with a variable aperture. The corrections are effected on a digital basis.

---

This invention relates to a method of and apparatus for automatically controlling exposure times in a photographic copying machine.

In photographic copying machines used for the reproduction of colour negatives it has already been proposed to measure the overall brightness or colour intensities of the picture and to control the exposure by reference to the result of this measurement. In the evaluation of the measurement of colour intensity the picture is usually so illuminated that the overall colour measurement of the colour separation images in the three primary colours red, blue and green is balanced in the gray scale on the assumption that the picture in the overall measurement contains equal proportions of red, blue and green. However, this assumption holds only in the case of well balanced colour pictures.

When copies are produced by reference to an automatically performed brightness measurement the illumination is such that the same quantity of light always falls on the photographic paper and the same overall gray scale stage is thus provided for each picture. This may introduce errors in exposure due to wider variations in the local densities of the picture.

In order to avoid errors in reproduction resulting from an overall measurement of the picture it has been proposed to use gray scale balancing to only a qualified or limited extent and it was found that the number of faulty copies containing a colour cast could thus be reduced in automatic copying machines. However, for automatically correcting the exposure times for the purpose of avoiding density errors due to a nonuniform picture content no simple technical means are as yet known in the art. It has therefore been hitherto necessary to submit the picture content of each picture to a human visual assessment. An expert observer must examine each picture for the existence of areas likely to give rise to an error in copying. The further corrections required for automatically adjusting the exposure times are determined either by personal experience and by comparison with reference pictures or by a separate photoelectric measuring device. The critical examination of picture content may be performed by an expert in a separate stage preceding the copying process or by the person operating the copying machine itself. In the former case the data for correction must be retained, but only one expert person is needed for several copying machines, whereas in the latter case no retention of data is needed in principle, but an operator experienced in making this kind of assessment is required at each copying machine.

It is an object of the present invention to overcome the above described difficulties by replacing the need for subjective human assessment by technical means.

Another object of the invention is to eliminate the risk of faulty exposure in copying due to human error in subjective assessments by providing a method of exactly measuring brightness in separate areas which makes allowance for the nature of the picture content.

The invention is based on the realization that the majority of all pictures which remain after the elimination of those pictures which have a uniform distribution of brightness over the entire picture area, can be classified in two separate groups having differing picture contents. One group comprises pictures containing upper and lower halves of different brightnesses, for instance a darker landscape and a brighter sky or foreground and background subjects of considerably different brightnesses. The other group comprises pictures with a pronounced singularity in the centre of the picture differing substantially in brightness from its surroundings. Pictures containing considerable differences in brightness and incapable of being classified under the above two heads are very rare and usually require artistic evaluation for an assessment of exposure times.

The present invention now provides in a first aspect a method of automatically controlling exposure times in a photographic copying machine which uses colour exposure control signals for the copying process generated in accordance with a measurement of the brightness of the whole area of the picture to be copied, wherein the improvement comprises measuring the brightness of two halves of the picture above and below the horizontal centre line of the picture; comparing the measured brightnesses of the two picture halves to obtain a first correction signal the value of which indicates which picture half is the brighter; and correcting the values of said control signals in accordance with the value of said first correction signal, the correction values being applied in the sense of increasing or decreasing the values of the control signals for a lower picture half which is darker or lighter respectively than the upper picture half; and by scanning the picture for a singularity therein of different brightness to the remainder of the picture to derive a second correction signal the value of which indicates the brightness of such a singularity relative to the remainder of the picture; and correcting the values of said control signals in accordance with said second correction signal, the correction values being applied in the sense of increasing or decreasing the values of the control signals for a singularity which is darker or brighter respectively than the remainder of the picture.

In the method of the invention set out above, the senses in which the correction values are applied are defined. In practise, it is preferred to make zero correction for values of the first and second correction signals which lie within prescribed upper and lower limits. The correction signals are also preferably digitized (put in digital form) and the correction values of the colour exposure control signals given discrete and specified values.

A second aspect of the invention is the provision of apparatus for automatically controlling exposure times in a photographic copying machine which uses colour exposure control signals generated in accordance with a measurement of the brightness of the whole area of the picture to be copied, the apparatus comprising:

(1) A measuring head for cooperating with a picture to be copied, the measuring head including (a) First masking means actuable to adopt a first, second or third position to expose the one, other or both respectively horizontal halves of the picture;

(b) Second masking means providing a variable aperture exposure of the picture when said first masking means is in its third position;

(c) Means responsive to light transmitted through the picture and said masking means to provide a signal representing the brightness of the exposed area of the picture;

(2(a)) First and second analog storage devices and switching means actuable in accordance with the positions of said first masking means to connect said first and second analog storage devices to receive said brightness-representing signal when said first masking means is in its first and second positions, respectively;

(b) Means coupled to said first and second storage devices to subtract the brightness signal values stored therein and provide a difference signal therefrom;

(c) First and second comparators operating with upper and lower reference limits respectively coupled to said subtraction means and responsive to said difference signal to provide a first predetermined signal upon said difference signal having a value above or below said upper or lower limits respectively and a second predetermined signal upon said difference signal having a value between said limits; and (d) First and second digital storage devices coupled to said first and second comparators respectively to store the signals therefrom for application to said copying machine to modify said generated control signal values therein;

(3(a)) means coupled to receive and twice differentiate said brightness signal to provide an output signal which represents the second differential of said brightness signal when said first masking means is in its third position and said second masking means is actuated to provide a decreasing exposure area;

(b) Third and fourth comparators having second upper and lower limits respectively and coupled to receive said differential signal to provide a third predetermined signal if said second differential signal has a value above or below said second upper and lower limits respectively and to provide a fourth predetermined signal if said second differential signal has a value between said second limits; and (4) Further digital storage means for storing signals in accordance with said third and fourth predetermined signals for application to said copy machine to modify said generated control signal values.

The proposed use of digital operation in the subject matter of the invention (in both the method and the equipment) permits the expenditure in technical means to be kept low.

For a better understanding of the present invention and to show how the same may be put into effect, both the method and apparatus thereof will now be described by means of an exemplary embodiment illustrated in the accompanying drawings in which:

FIGURES 1 and 2 represent the construction in principle of a measuring head comprising a half picture mask (FIGURE 1) and a variable aperture mask (FIGURE 2), and FIGURE 3 is a block schematic circuit of electronic apparatus for correcting colour exposure control signals generated in a copying machine.

The parts illustrated in FIGURES 1 and 2 are normally combined in a single measuring head, the two illustrated masks (14 and 26, 27) being located the one above the other. The measuring head contains a ground glass screen 11 which carries the colour film negative 12 containing the individual negative frames 13 that are to be copied. The screen 11 is illuminated from beneath by means not shown and the luminance of the entire surface of the ground glass screen should be uniform and the screen should provide a highly diffused illumination. The frames are consecutively advanced into measuring position and precisely located. A photoelectric device 19 (more than one device may be used) is mounted a fixed distance above the centre of each frame and receives the light transmitted through the exposed part of the film, converting this light into an analogous electrical signal. In order to prevent scattered extraneous light from affecting the photo-element the latter is provided with a hood 20 which encloses the entire space above the film.

It will be understood from FIGURE 1 that a slide 14 is provided above the arrested frame (containing the original picture that is to be copied) and that this slide has a window 15 adapted to expose one half of the frame. The slide thus forms a mask which can be slidably displaced a distance equal to one half the length of the side of the frame. The mask exposes either only the top or the bottom half of the picture, according to whether the slide 14 is in its rear or forward position. The slide is provided with two arresting notches 16, 17 which in each of the two measuring positions are engaged by a roller 18 which thus precisely locates the mask in each of its measuring positions. Moreover, two electrical switches 21, 22 are associated with the slide 14 and, according to the position of the slide, either the one or the other of the two switches is closed. One contact of each switch is electrically connected to one pole of the photoelectric device 19. The brightness signal for the upper half of the picture can thus be transmitted through switch 21 and that for the lower half of the picture through switch 22. For an overall measurement of the brightness of the entire picture surface to generate the basic colour exposure control signals the slide 14 is completely withdrawn. This measurement is also made via the photoelectric device 19. The generation of the basic control signals is known to those in the art and need not be described in detail here.

In FIGURE 2 the ground glass screen is again designated by numeral 11, the photoelectric device by 19, the hood by 20, the film by 12 and the frames containing the pictures that are to be copied by 13. For detecting and measuring the brightness of a singularity in the centre region of the picture a second mask is provided above the located frame (either above or below the slide 14 in FIGURE 1) and this mask is formed by two L-shaped plates 26, 27 so disposed that the inside edges of the two L's combine to form a rectangle which registers with the sides of the frame when the measuring process begins. The two L-shaped plates provide a variable aperture for scanning the picture area to detect a brightness singularity. The scanning is effected by moving the two L-shaped plates diagonally closer together until the aperture of the mask contracts to nil in the picture centre. During this process the slide 14 (FIGURE 1) is completely withdrawn.

The photoelectric device 19 converts the light flux passing through the picture and the mask into an electrical signal which changes as the aperture of the mask contracts from the edges of the picture to the centre. In the presence of a pronounced singularity the analogous electrical signal will change or jump abruptly. From a potentiometer 30 with a slider 31 which moves according to the position of the mask an additional electrical position signal is obtained which represents the size of the singularity.

In the block diagram of the electrical circuitry shown in FIGURE 3 the measuring head generally is marked M and for convenience and clarity is shown as comprising three separate measuring devices 33, 39 and 40 although as indicated above the photoelectric device 19 is preferably used a common element. Circuit arrangements for separating the signals obtained will occur readily to those skilled in the art. The device 33 is for the overall brightness measurement of the entire picture area for each colour component, the device 39 for the overall brightness measurement of the two halves of the picture as shown in FIGURE 1, and the device 40 shown in FIGURE 2 for measuring the brightness of a singularity in the central area of the picture. The signal outputs of the measuring device 33 which are preferably balanced in the gray scale are connected by a red signal line 34, a green signal line 35 and a blue signal line 36 to a controller 37 for the automatic exposure.

As illustrated in FIGURE 1, the photoelectric device 19 (which is common to all three measuring devices) is connectable by the two switches 21, 22 to analog storage devices 41, 42. The element 19 first measures the overall brightness of the upper half of the picture and an analog signal is stored in the analog storage device 41. It then measures the overall brightness if the bottom half of the picture, an equivalent signal being stored in the analog storage device 42. No colour measurement takes place since only the difference in brightness between the two picture halves determines the proposed correction of the exposure time. It is desired to compare the two picture-half signals and the signal value in the two analog storage devices 41, 42 are transferred to a comparator 43 adapted to subtract one signal from the other to develop a correction signal representing the difference between the two brightness signals. The output of comparator 43 is connected to a different kind of comparator 44 which provides a positive reference level or upper signal value limit. The comparator acts to digitize the signal into the two digital values (above and below the limit) and the result is stored in a digital storage device 46. Similarly, the output of comparator 43 is connected to a second comparator 45 which has a negative reference level (or lower signal value limit). The digitized signal is stored in a second digital storage device 47. If the difference signal exceeds the positive reference level 44 a digital signal L is transmitted to the first digital storage device 46 and stored therein. This is used as a correcting signal of value +1 for the exposure control signals. If the difference signal falls below the negative reference level 45 a digital signal L is transmitted to the second storage unit 47 and stored. This is used as a correcting signal of value −1. Should the difference signal be between both levels 44 and 45, a digital signal 0 is generated and stored, and no correction ensues.

In the device 40 shown in FIGURE 2 for detecting a singularity the photoelectric device 19 (FIGURE 2) continuously measures the overall brightness irrespectively of the colour components of the picture whilst the second mask contracts. In the presence of a pronounced singularity the measuring signal changes abruptly. For the purpose of evaluating this change the brightness signal is electrically twice differentiated by the differentiating circuit 48. The second differential signal has a minimum or maximum at the discontinuity in brightness according to whether the singularity is brighter or darker than its environment. The second differential signal provides a further correction for the exposure times and like the first correction signal is digitized. To this end the output of the differentiating circuit 48 is connected to a comparator 49 providing an upper reference level or limit which has associated therewith third and fifth digital storage devices 51 and 58. Circuit 48 is also connected to a comparator 50 providing a lower reference level or limit which has associated therewith fourth and sixth digital storage devices 52 and 59. If the second differential signal minimum is below the lower reference level the comparator 50 generates a digital signal L. If the signal maximum rises above the upper reference level the comparator 49 generates a digital signal L. However, if the second differential signal exceeds neither reference level the comparators 49, 50 generate the digital signal 0. No correction of exposure time is made as a result.

The device 40 is as already mentioned, further provided with a position indicating potentiometer 30 (FIGURE 2) which is connected to a comparator 53. The signal which changes in proportion to the mask aperture is compared with an adjustable reference level corresponding to a singularity of given size. If the size of the singularity exceeds the size represented by the reference, the comparator 53 generates a digital signal L which appears in its second output B. A digital signal 0 will then appear in the first output A of the comparator. This location criterion is combined with the twice differentiated signals for the generation of digital correcting signals. For this purpose the L-exits of the comparators 49, 50 together with the B-exit of comparator 53 are connected through AND-gates 54, 55 to digital storage devices 51, 52. At the same time the L-exits of the comparators 49, 50 and the A-exit of comparator 53 are connected through AND-gates 56, 57 to storage devices 58 and 59 respectively.

When a picture contains a singularity which differs sufficiently in brightness from its environment and this singularity exceeds in size the preadjustable reference, then a digital signal L will be transmitted to the storage element 51 which has the correcting value +1 when the singularity is a dark area in a bright environment, whereas in the case of a bright singularity on a dark background a digital signal which has the correcting value −1 will be transmitted to the storage element 52. If the size of the singularity is less than the reference size so that output A of comparator 53 has an output L and has the form of a dark singularity on a birght background, a digital signal L which indicates a correction value of +2 will be transmitted to the storage device 58, whereas in the case of a bright singularity on a dark background a digital signal L which indicates a correction value of −2 will be transmitted to the storage device 59.

The outputs from storage devices 46 and 47 can be regarded as components of a first, digitized, correction signal capable of having three values +1, 0 and −1. The outputs from storage devices 51, 52, 58 and 59 can be regarded as components of a second, digitized, correction signal capable of five values +2, +1, 0, −1 and −2. These correction signals are applied to the controller 37.

The L-exits of the two storage devices 46 and 51 are connected through an OR-gate 60 and a control line 61 to the controller 37. A signal component sent through this line causes the exposure time to be corrected by an amount +1. The L-exits of the storage elements 47 and 52 are similarly connected through an OR-gate 62 and a control line 63 to the controller 37. A signal component sent through this line causes the exposure to be corrected by an amount −1. The L-exits of the storage elements 58, 59 are connected by control lines 64 and 65 respectively to the controller 37. Signal components appearing in these two lines have correcting effects of value +2 and −2 on the exposure.

The arrangement illustrated in FIGURE 3 is used to effect corrections either in the case of pictures containing a horizon or pictures containing a singularity exhibiting a considerable difference in brightness. The singularity is also critically examined for size. Other criteria can be applied by suitable combinations. For instance, a criterion that may be applied is that a dark singularity in a picture with a dark foreground is to provide a correction of value +2. In this instance the L-exits of the storage devices 46 and 51 would be connected by an AND-gate and the output of the gate together with the L-exit of the storage device 58 sent through an OR-gate into the conrol line 64.

The method and apparatus proposed by the present invention is intended to dispense with the need of an attendant whose task it is in a copying machine with automatic exposure to effect corrections to the exposure by reference to his subjective evaluation of the pictures that are to be copied. Since all the negatives that are to be copied pass through the copying machine, the risk of faulty prints caused by irregular distribution of brightness in a picture and the necessity of producing another print after correction of the exposure time can be made small.

The copying machine and the measuring head may be associated or the copying machine may be located behind the measuring head in the direction of travel of the film that is to be copied.

I claim:

1. A method of automatically controlling exposure times in a photographic copying machine which uses colour exposure control signals for the copying process generated in accordance with a measurement of the brightness of the whole area of the picture to be copied, wherein the improvement comprises measuring the brightnesses of two halves of the picture above and below the horizontal centre line of the picture; comparing the measured brightnesses of the two picture halves to obtain a first correction signal the value of which indicates which picture half is the brighter; and correcting the values of said control signals in accordance with the value of said first correction signal, the correction values being applied in the sense of increasing or decreasing the values of the control signals for a lower picture half which is darker or lighter respectively than the upper picture half; and by scanning the picture for a singularity therein of different brightness to the remainder of the picture to derive a second correction signal the value of which indicates the brightness of such a singularity relative to the remainder of the picture; and correcting the values of said control signals in accordance with said second correction signal, the correction values being applied in the sense of increasing or decreaning the values of the control signals for a singularity which is darker or brighter respectively than the remainder of the picture.

2. A method as defined in claim 1 in which said first and second correction signals are digitized and the corrections to said control signals are made in specified discrete values in accordance with the digital values of said correcting signals.

3. A method as defined in claim 1, in which said scanning of the picture is effected to find a singularity centrally located in the picture.

4. A method as defined in claim 2, in which digitizing is effected by comparing said first correction signal with first upper and lower reference limits to obtain a digital value indicating that the first correction signal is above the first upper limit between the first limits and below the first lower limit respectively; and comparing said second correction signal with second upper and lower reference limits to obtain a digital value indicating that the second correction signal is above the second upper limit, between the second limits or below the second lower limit respectively; and in which zero correction value for said control signals is assigned for values of said first and second correction signals between said first and second limits respectively.

5. A method as defined in claim 4 wherein the improvement comprises measuring the size of said singularity and comparing the measurement with a reference representing a predetermined size of singularity to derive a third correction signal the value of which indicates the size of the singularity relative to said predetermined size; combining said third correction signal with said second correction signal in the digitizing of the latter to generate a digital signal which, for values of said second signal outside said second limits, produces a greater or lesser correction of the values of said control signals according to whether said third correction signal has a value indicating that the singularity has a size less or more than respectively said predetermined size.

6. A method as defined in claim 5, in which said greater correction value of said control signals is selected to be at least twice said lesser correction value.

7. Apparatus for automatically controlling exposure times in a photographic copying machine which uses colour exposure control signals generated in accordance with a measurement of the brightness of the whole area of the picture to be copied, the apparatus comprising:

(1) a measuring head for co-operating with a picture to be copied, the measuring head including
 (a) first masking means actuable to adopt a first, second or third position to expose the one, other or both respectively horizontal halves of the picture;
 (b) second masking means providing a variable aperture exposure of the picture when said first masking means is in its third position;
 (c) means responsive to light transmitted through the picture and said masking means to provide a signal representing the brightness of the exposed area of the picture;

(2(a)) first and second analog storage devices and switching means actuable in accordance with the positions of said first masking means to connect said first and second analog storage devices to receive said brightness-representing signal when said first masking means is in its first and second positions respectively;
 (b) means coupled to said first and second storage devices to subtract the brightness signal values stored therein and provide a difference signal therefrom;
 (c) first and second comparators operating with upper and lower reference limits respectively coupled to said subtraction means and responsive to said difference signal to provide a first predetermined signal upon said difference signal having a value above or below said upper or lower limit respectively and a second predetermined signal upon said difference signal having a value between said limits; and
 (d) first and second digital storage devices coupled to said first and second comparators respectively to store the signals therefrom for application to said copying machine to modify said generated control signal values therein;

(3(a)) means coupled to receive and twice differentiate said brightness signal to provide an output signal which represents the second differential of said brightness signal when said first masking means is in its third position and said second masking means is actuated to provide a decreasing exposure area.
 (b) third and fourth comparators having second upper and lower limits respectively and coupled to receive said second differential signal to provide a third predetermined signal if said second differential signal has a value above or below said second upper and lower limits respectively and to provide a fourth predetermined signal if said second differential signal has a value between said second limits; and (4) further digital storage means for storing signals in accordance with said third and fourth predetermined signals for application to said copy machine to modify said generated control signal values.

8. Apparatus as defined in claim 7, further comprising:

(5(a)) a potentiometer having its slider coupled to said second masking means to derive a signal representing the position of, and thereby the picture exposure area provided by, said second masking means;
 (b) a fifth comparator coupled to receive said position-representing signal and to compare it with a reference representing a predetermined size of singularity so as to provide a digital size signal having a first or second value indicative of the size of a detected singularity being greater or less respectively than said predetermined size;

(6(a)) first and second AND-gates each having two inputs a first of which is coupled to said fifth comparator to be activated by the first value of said digital size signal, said first AND-gate having its second input coupled to said third comparator to transmit said third predetermined signal therefrom and said second AND-gate having its second input coupled to said fourth comparator to transmit said third predetermined signal therefrom.
  (b) third and fourth AND-gates each having two inputs a first of which is coupled to said fifth comparator to be activated by the second value of said digital size signal, said third AND-gate having its second input coupled to said third comparator to transmit said third predetermined signal therefrom and said second AND-gate having its second input coupled to said fourth comparator to transmit said third predetermined signal therefrom; and
(7) said further digital storage means comprising third, fourth, fifth and sixth digital storage devices coupled to the outputs of said first, second, third and fourth AND-gates respectively to store the signals transmitted by the latter.

9. Apparatus as defined in claim 8, further comprising:
(8(a)) a first OR-gate having respective inputs coupled to the outputs of said first and third digital storage devices;
  (b) a second OR-gate having respective inputs coupled to the outputs of said second and fourth digital storage devices;
  (c) means having a first set of inputs to receive said colour exposure control signals and having a second set of four inputs coupled to the outputs of said first OR-gate said second OR-gate, said fifth digital storage device and said sixth digital storage device respectively and adapted to increase the value of said control signals in response to signals from said first OR-gate, to increase to a greater extent the value of said control signals in response to signals from said fifth digital storage device, to decrease said control signals in response to signals from said second OR-gate, and to decrease to a greater extent said control signals in response to signals from said sixth digital storage device.

10. Apparatus according to claim 7, in which said second masking means comprises a pair of L-shaped members overlappingly arranged to define a rectangular exposure aperture, the members being relatively movable along the diagonal joining the inside corners of the L-shapes.

References Cited
UNITED STATES PATENTS

| | | | |
|---|---|---|---|
| 1,592,407 | 7/1926 | Ybarrondo | 355—83 |
| 3,115,807 | 12/1963 | Craig et al. | 355—38 |
| 3,351,766 | 11/1967 | Weisglass | 355—83 |
| 3,376,426 | 4/1968 | Frommer et al. | 250—219 |
| 3,426,357 | 2/1969 | Paulus | 355—83 |

NORTON ANSHER, Primary Examiner

DAVID B. WEBSTER, Assistant Examiner

U.S. Cl. X.R.

355—83